United States Patent
Nakamura et al.

(10) Patent No.: US 6,713,034 B2
(45) Date of Patent: Mar. 30, 2004

(54) POROUS CARBON ELECTRODE MATERIAL, METHOD FOR MANUFACTURING THE SAME, AND CARBON FIBER PAPER

(75) Inventors: Makoto Nakamura, Otake (JP); Yoshihiko Hosako, Otake (JP); Hidehiko Ohashi, Otake (JP); Mitsuo Hamada, Otake (JP); Kazushige Mihara, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 30 days.

(21) Appl. No.: 09/807,205

(22) PCT Filed: Jan. 25, 2001

(86) PCT No.: PCT/JP01/00486
§ 371 (c)(1),
(2), (4) Date: Apr. 11, 2001

(87) PCT Pub. No.: WO01/56103
PCT Pub. Date: Aug. 2, 2001

(65) Prior Publication Data
US 2002/0175073 A1 Nov. 28, 2002

(30) Foreign Application Priority Data

Jan. 27, 2000 (JP) .......................................... 2000-018391
Jul. 4, 2000 (JP) .......................................... 2000-201781

(51) Int. Cl.[7] .................................................. D01F 9/12
(52) U.S. Cl. ................ 423/447.2; 423/445; 423/447.1; 428/408; 428/488.1; 106/31.29; 526/341; 526/342; 527/400
(58) Field of Search .............................. 423/445, 447.1, 423/447.2; 428/408, 488.1; 106/31.29; 526/341, 342; 527/400

(56) References Cited

U.S. PATENT DOCUMENTS

| 4,759,989 A | | 7/1988 | Abe et al. | |
|---|---|---|---|---|
| 5,648,027 A | * | 7/1997 | Tajiri et al. | 264/43 |

FOREIGN PATENT DOCUMENTS

| JP | A-50-18702 | 2/1975 |
|---|---|---|
| JP | 2-92881 | 4/1990 |
| JP | 3-285873 | 12/1991 |
| JP | 8-2979 | 1/1996 |
| JP | 9-324390 | 12/1997 |

OTHER PUBLICATIONS

Patent Abstracts of Japan, "Carbon Fiber Paper and Porous Carbon Board", Publ. No. 09324390 A; Publ. Date: Dec. 16, 1997, Inoue Mikio.
Patent Abstracts of Japan, "Porous Carbon Material and Its Production", Publ. No. 08002979 A, Pub. Date: Jan. 9, 1996, Hiroyuki et al.
Patent Abstracts of Japan, "Highly Graphitized Porous Carbon Fiber Sheet and Production Thereof", Publ. No. 02092881 A, Publ. Date: Apr. 3, 1990, Osamu et al.
Patent Abstracts of Japan, "Carbon Plate and Production Thereof", Publ. No. 03285873 A, Publ. Date: Dec. 12, 1991, Murakami Shigeru.

* cited by examiner

*Primary Examiner*—Bruce F. Bell
(74) *Attorney, Agent, or Firm*—Fitch, Even, Tabin & Flannery

(57) ABSTRACT

The present invention provides carbon fiber paper consisting of an organic high-molecular compound as a binder and carbon fibers, characterized in that the carbon fibers contain thin fibers with an average diameter smaller than 5 $\mu$m and an average fiber length of 3 to 10 mm; a porous carbon electrode substrate for a fuel cell having a thickness of 0.05 to 0.5 mm and a bulk density of 0.3 to 0.8 g/cm$^3$, also having a bending strength of 10 MPa or higher and a deflection of 1.5 mm or more at the time of bending, measured by a three-point bending test in conditions of using a sample width of 1 cm, a strain rate of 10 mm/min, and a distance between supporting points of 2 cm; and a method of producing a porous carbon electrode substrate for a fuel cell by impregnating the carbon fiber paper with a thermosetting resin, curing the thermosetting resin by heating and pressing treatment, and then carbonizing the paper.

The electrode substrate of the present invention is excellent in flexibility and bending strength and able to be rolled on a roll and thus has high productivity, and the carbon fiber paper of the present invention is suitable for producing the electrode substrate.

15 Claims, 1 Drawing Sheet

POROUS CARBON ELECTRODE MATERIAL, METHOD FOR MANUFACTURING THE SAME, AND CARBON FIBER PAPER

This application is the National Phase of International Application PCT/JP01/00486 filed Jan. 25, 2001 which designated the U.S. and that International Application was not published under PCT Article 21(2) in English.

TECHNICAL FIELD

The present invention relates to carbon fiber paper and an electrode substrate for a fuel cell using the paper and more particularly an electrode substrate for a solid polymer electrolyte fuel cell and its production method.

BACKGROUND ART

As compared with an electrode for a phosphoric acid fuel cell, an electrode for a solid polymer electrolyte fuel cell is required to have gas diffusion-permeability, strength to be durable to handling, flexibility, strength to stand the compression at the time of electrode production and electrode assembly, and the like. Further, since the solid polymer electrolyte fuel cell is required to be small in size, as compared with a phosphoric acid fuel cell, the electrode for it is also required to be thin. As the electrode for such a solid polymer electrolyte fuel cell, mainly used are those which are produced by forming paper from carbon short fibers, impregnating the paper with a thermosetting resin, curing the resin, and then carbonizing the resultant paper, and in order to improve the productivity of a fuel cell, the electrode has to be flexible enough to be rolled in a roll. However, many electrodes ever made available are thick and mostly easily broken when being bent. Further, since those conventional electrodes have a few contacting points of carbon fibers, they have a problem that the conductivity becomes worse if the porosity is increased.

A porous carbon electrode substrate provided with an improved conductivity by mixing carbonaceous milled fibers is described in Japanese Patent Laid-Open No. 142068/1995, however the substrate is too thick in thickness and thus insufficient in flexibility to be used for a solid polymer electrolyte fuel cell.

Invention of a porous carbon plate and its production method is described in Japanese Patent Laid-Open No. 157052/1997, the electrode of the invention has a low bulk density and therefore it cannot be said that the conductivity of the electrode is sufficient.

DISCLOSURE OF THE INVENTION

Objects of the present invention are to solve the above described problems and provide an electrode substrate for a fuel cell having high conductivity and flexibility, its production method, and carbon fiber paper suitable for producing the electrode substrate.

The present invention provides carbon fiber paper consisting of an organic high-molecular compound as a binder and carbon fibers, the carbon fibers containing thin fibers with an average diameter smaller than 5 $\mu$m and an average fiber length of 3 to 10 mm.

In the carbon fiber paper of the present invention, the organic high-molecular compound is preferably polyvinyl alcohol, and the organic high-molecular compound is preferably pulp-like substances or short fibers of an acrylonitrile type polymer. Further, the foregoing carbon fibers are preferably only of polyacrylonitrile type carbon fibers. Furthermore, the foregoing carbon fibers are preferably a mixture of thin fibers with an average diameter larger than 3 $\mu$m and smaller than 5 $\mu$m and an average fiber length of 3 to 10 mm and thick fibers with an average diameter not smaller than 5 $\mu$m and smaller than 9 $\mu$m and an average fiber length of 3 to 10 mm. It is also preferable for the foregoing carbon fibers to contain not less than 40% by mass of the foregoing thin fibers.

The present invention also provides a porous carbon electrode substrate for a fuel cell having a thickness of 0.05 to 0.5 mm and a bulk density of 0.3 to 0.8 g/cm$^3$, and also having a bending strength of 10 MPa or higher and a deflection of 1.5 mm or more at the time of bending, measured by a three-point bending test in conditions of using a sample of 1 cm width, a strain rate of 10 mm/min and a distance between supporting points of 2 cm.

The electrode substrate of the present invention preferably has a length of 1 m or larger and can be rolled around a roll with an outer diameter of 50 cm or smaller. Further, it is preferred that the electrode substrate contains carbon fibers, and the foregoing carbon fibers are only of polyacrylonitrile type carbon fibers. Furthermore, it is preferred that the electrode substrate contains carbon fibers, and the carbon fibers are a mixture of thin fibers with an average diameter larger than 3 $\mu$m and smaller than 5 $\mu$m and an average fiber length of 3 to 10 mm and thick fibers with an average diameter not smaller than 5 $\mu$m and smaller than 9 $\mu$m and an average fiber length of 3 to 10 mm. It is also preferable for the electrode substrate to contain carbon fibers which contain not less than 40% by mass of the foregoing thin fibers in the total carbon fibers.

The present invention also provides a method of producing a porous carbon electrode substrate for a fuel cell by impregnating carbon fiber paper consisting of an organic high-molecular compound as a binder and carbon fibers with an average diameter smaller than 5 $\mu$m and an average fiber length of 3 to 10 mm with a thermosetting resin, curing the thermosetting resin by heating and pressing treatment, and then carbonizing the resultant paper.

In the production method of the present invention, it is preferable to use carbon fiber paper, among the above described carbon fiber paper, wherein the carbon fibers are made of a mixture of thin fibers with an average diameter larger than 3 $\mu$m and smaller than 5 $\mu$m and an average fiber length of 3 to 10 mm and thick fibers with an average diameter not smaller than 5 $\mu$m and smaller than 9 $\mu$m and an average fiber length of 3 to 10 mm. Further, the foregoing heating and pressing treatment is preferably carried out continuously in the whole length of the carbon fiber paper. Further, prior to the heating and pressing treatment, the carbon fiber paper impregnated with the thermosetting resin is preferably pre-heated. Furthermore, the heating and pressing treatment is preferably carried out using a continuous type hot press machine equipped with a pair of endless belts, or the heating and pressing treatment is preferably carried out using a continuous type hot roll press machine. In the heating and pressing treatment, the pressure application is preferable to be carried out at a line pressure of $1.5 \times 10^4$ to $1 \times 10^5$ N/m.

In the production method of the present invention, the foregoing carbonization is preferably carried out continuously in the whole length of the carbon fiber paper. Further, the electrode substrate obtained by the foregoing carbonization is preferable to be rolled around a roll with the outer diameter of 50 cm or smaller. Furthermore, a conductive substance is preferably added to the foregoing thermosetting resin.

BEST MODE FOR CARRYING OUT THE INVENTION

Figure 1:
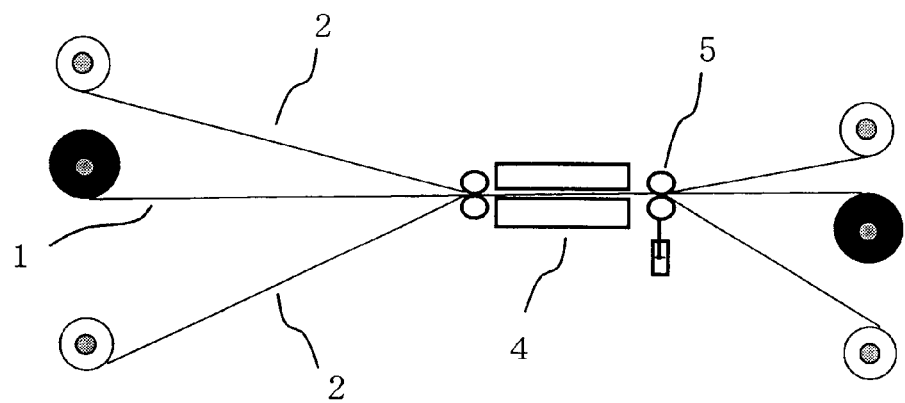
FIG. 1 shows an example of a continuous type hot roll press machine suitable to be used for the production method of the present invention.

Hereinafter, the present invention will more particularly be described.

The carbon fiber paper of the present invention consists of carbon fibers containing thin carbon fibers with an average diameter smaller than 5 $\mu$m and an average fiber length of 3 to 10 mm and an organic high-molecular compound as a binder.

In the present invention, by using carbon short fibers with an average diameter smaller than 5 $\mu$m, preferably larger than 3 $\mu$m and not larger than 4.5 $\mu$m, the bending strength and the flexibility of the porous electrode substrate can be improved. In the case of using only thick carbon fibers with an average diameter larger than 5 $\mu$m, the flexibility becomes insufficient and the contacting points among fibers are too small in number, and the resistance of an electrode produced from such carbon fiber paper becomes too high. Further, by making an average diameter larger than 3 $\mu$m, the carbon fiber paper is made dense and is capable of preventing the decrease of gas permeability and therefore it is preferable.

Further, an average fiber length of the carbon fibers is preferable to be 3 to 10 mm and further preferable to be 3 to 9 mm in terms of the strength and the smoothness of a substrate. In the case where an average fiber length is smaller than 3 mm, the fibers are less entangled to result in decrease of the strength of the substrate. On the other hand, in the case of exceeding 10 mm, the dispersibility of fibers in a dispersant is decreased to result in formation of uneven carbon fiber paper.

The foregoing thin fibers with an average diameter smaller than 5 $\mu$m and an average fiber length of 3 to 10 mm are preferable to be not less than 40% by mass in the total carbon fibers. That is, mixed carbon fibers can be used as the carbon fibers of the present invention, the mixed carbon fibers being a mixture of 40% by mass or more of thin fibers with an average diameter smaller than 5 $\mu$m and an average fiber length of 3 to 10 mm and 60% by mass or less of carbon fibers with an average diameter not smaller than 5 $\mu$m in the total carbon fibers. In order to maintain flexibility and high conductivity of an electrode substrate, it is preferable to contain not less than 40% by mass of the foregoing thin fibers with an average diameter smaller than 5 $\mu$m in the mixed carbon fibers.

Other than the carbon fibers with an average fiber diameter smaller than 5 $\mu$m and an average fiber length of 3 to 10 mm, carbon fibers with an average fiber diameter not smaller than 5 $\mu$m are preferable to be used and carbon fibers with an average fiber diameter not smaller than 7 $\mu$m are further preferable to be used.

The carbon fibers contained in the carbon fiber paper are also preferably a mixture of thin fibers with an average diameter larger than 3 $\mu$m and smaller than 5 $\mu$m and an average fiber length of 3 to 10 mm and thick fibers with an average diameter not smaller than 5 $\mu$m and smaller than 9 $\mu$m and an average fiber length of 3 to 10 mm. The carbon fibers with the thin diameter contribute to the improvement of flexibility and conductivity of an electrode, whereas the carbon fibers with the thick diameter contribute to the improvement of dispersibility of the fiber substrate and gas permeability. Consequently, carbon fiber paper produced by properly mixing these fibers is provided with all of the above described advantages and that is preferable.

The carbon fibers to be used in the present invention may be any of polyacrylonitrile type carbon fibers, pitch type carbon fibers, rayon type carbon fibers, and the like. However, polyacrylonitrile type carbon fibers, which have a relatively high mechanical strength are preferable and particularly, it is preferable that carbon fibers to be used are solely polyacrylonitrile type carbon fibers.

The polyacrylonitrile type carbon fibers are produced using, as a raw material, polymers mainly containing acrylonitrile. Practically, they are carbon fibers obtained through a spinning process for spinning acrylonitrile type fibers, oxidizing process for converting the fibers into oxidized fibers by heating them at 200 to 400° C. in air atmosphere, and carbonizing process for heating and carbonizing the resultant fibers at 300 to 2500° C. in an inert gas such as nitrogen, argon, helium, and the like, and preferably used as composite material-reinforcing fibers. Therefore, the fibers have high strength as compared with other type carbon fibers and can be formed into carbon fiber paper with high mechanical strength.

The methods applicable for the paper-manufacturing method for producing the carbon fiber paper include a wet method for producing paper by dispersing carbon short fibers in a liquid medium and a dry method comprising steps of dispersing carbon short fibers in air and depositing the fibers. A proper amount of an organic high-molecular substance is preferable to be added as a binder for binding the carbon fibers one another. In that way, the strength of carbon fiber paper is maintained and separation of the carbon fibers from carbon fiber paper during the production process can be prevented and the orientation of the carbon fibers can be prevented from changing.

As the organic high-molecular compound, polyvinyl alcohol or acrylonitrile type polymers in pulp-like state or their short fibers are preferable. The pulp-like materials or short fibers of the acrylonitrile type polymers are especially preferable since their carbonized materials can function as conductors. Further, since the polyvinyl alcohol is excellent in the contacting in the paper-manufacturing process, it is preferable as a binder to suppress the separation of the carbon short fibers. Further, the polyvinyl alcohol is almost all decomposed and volatilized in the carbonization process in the final stage of producing the electrode substrate and forms voids. Owing to the existence of the voids, the water and gas permeability is improved and therefore, the polyvinyl alcohol is preferable.

The pulp-like materials have a structure in which a large number of fibrils with several $\mu$m or thinner diameter are branched from fibrous trunks, and in a sheet-like material produced from the pulp-like materials, the fibers are efficiently entangled with one another and even if a thin sheet-like material, the material has an advantage that it is excellent in the handling property. The short fibers of acrylonitrile type polymers can be obtained by cutting fiber threads made of acrylonitrile type polymers or tows of the fibers in a prescribed length.

The content of the organic high-molecular compound in the carbon fiber paper is preferably within a range from 5 to 40% by mass and more preferably within a range from 15 to 30% by mass. In order to lower the electric resistivity of the electrode substrate obtained by impregnating the carbon fiber paper with a resin and carbonizing the paper, it is better as the content is less, and the content is preferably not higher than 40% by mass. From the viewpoint of keeping the strength and the shape of the carbon fiber paper, the content is preferably 5% by mass or higher.

As a method for mixing the pulp-like materials or short fibers of the organic high-molecular compound with carbon fibers, the following methods are preferable: a method for stirring and dispersing them together with carbon fibers in water and a method for directly mixing them. In order to evenly disperse them, the method for dispersing and diffusing in water is preferable.

After the carbon fiber paper is produced, the paper is hot-pressed by hot-press rolls to make the orientation and the thickness of the carbon fibers even and the fuzz which is characteristic of the carbon fibers can be suppressed to a minimum. The heating temperature of the hot-press rolls is preferably 100 to 150° C. and the pressure is preferably 0.5 to 20 MPa.

The porous carbon electrode substrate for a fuel cell of the present invention is a porous carbon electrode substrate for a fuel cell having the thickness of 0.05 to 0.5 mm, the bulk density of 0.3 to 0.8 g/cm$^3$, and the bending strength of 10 MPa or higher measured by a three-point bending test in conditions of using a sample width of 1 cm, a strain rate of 10 mm/min, and a distance between supporting points of 2 cm, and a deflection of 1.5 mm or more at the time of bending.

The porous carbon electrode substrate for a fuel cell comprises carbonaceous materials such as carbon fibers as main constituent elements and is a substrate having water or gas permeability and conductivity sufficient to function as an electrode of a fuel cell. As the gas permeability of the porous electrode substrate, it is preferable to be 200 ml-mm/hr-cm$^2$-mmAq or higher. As the conductivity, the through-plane resistivity is preferably 10 mΩ-cm$^2$ or lower in the case where the resistivity value is measured by applying electric current with current density of 10 MA/cm$^2$ while the electrode substrate being sandwiched between copper plates and pressurized at 1 MPa from the upper and the lower sides of the copper plates.

The thickness of the porous carbon electrode substrate is needed to be 0.05 to 0.5 mm from the viewpoint of the resistivity and preferable to be 0.1 to 0.3 mm. If the thickness is thinner than 0.05 mm, the strength in the thickness direction becomes low and it is insufficient to stand handling at the time of assembling a cell stack. On the other hand, if exceeding 0.5 mm, the electric resistivity becomes high and the total thickness becomes thick when a cell stack is assembled. The bulk density is required to be 0.3 to 0.8 g/cm$^3$ and preferable to be 0.4 to 0.7 g/cm$^3$. In the case where the bulk density is lower than 0.3 g/cm$^3$ not only the electric resistivity is increased but also satisfactory flexibility cannot be obtained. On the other hand, in the case where the bulk density exceeds 0.8 g/cm$^3$, the gas permeability is low and the performance of a fuel cell is decreased.

The bending strength of the porous carbon electrode substrate of the present invention is required to be 10 MPa or higher, preferably 40 MPa or higher, in the case where it is measured in conditions of using a sample width of 1 cm, a strain rate of 10 mm/min, and a distance between supporting points of 2 cm. If less than 10 MPa, the handling becomes difficult and, for example, the substrate easily cracks at the time of being rolled around a roll. By controlling the bending strength to be 10 MPa or higher, cracking can be prevented at the time of bending the electrode substrate. Moreover, the deflection at the time of bending is 1.5 mm or more, preferably 2.0 mm or more. In the case where the bending deflection is less than 1.5 mm, the electrode substrate is easy to be broken at the time of being continuously rolled around a roll and it becomes difficult to produce and handle a long electrode substrate.

It is preferable for the porous carbon electrode substrate for fuel cells of the present invention to have length of 1 m or longer and be able to be rolled around a roll with the outer diameter of 50 cm or smaller. If the electrode substrate is long and able to be rolled around a roll, not only the productivity of the electrode substrate is increased but also production of MEA (membrane/electrode assembly) in a successive process can continuously be carried out to contribute to the considerable cost down of a fuel cell. For that, the electrode substrate is preferable to be flexible enough to be rolled around a roll with the outer diameter at longest 50 cm, desirably 40 cm or smaller. The carbon electrode substrate which is able to be rolled around a roll with the outer diameter of 50 cm or smaller is excellent in flexibility and in through-passing property in the MEA production process, which is a successive process of the rolling, and therefore, it is preferable. Further, if the electrode substrate can be rolled around a roll with the outer diameter of 50 cm or smaller, the carbon electrode substrate in the form of a product can be compact and is advantageous in the packing and transportation cost. Also, in terms of prevention of breaking the electrode substrate, the roll radius R (cm) is preferable to satisfy the following inequality.

$$R > \frac{x^2 + 0.64}{0.8x} \tag{1}$$

wherein x denotes the deflection quantity (cm) at the moment of occurrence of rupture in bending in a three-point bending test.

In the present invention, carbon fiber paper containing thin carbon fibers with an average diameter smaller than 5 μm and an average fiber length of 3 to 10 mm is impregnated with a thermosetting resin, the thermosetting resin is cured by heating and pressing, and then the resultant carbon fiber paper is carbonized to give the porous carbon electrode substrate for a fuel cell.

The thermosetting resin to be employed for the present invention is preferable a substance having adhesiveness or fluidity at room temperature and also able to remain as a conductive substance even after carbonization, and a phenol resin, a furan resin and the like are applicable. A resol type phenol resin obtained by a reaction of phenols and aldehydes in the presence of an alkaline catalyst can be used as the foregoing phenol resin. Further, a solid and thermally fusible novolak type phenol resin produced by a reaction of phenols and aldehydes in the presence of an acidic catalyst by a publicly known method may be dissolved and mixed in a resol type fluid phenol resin, and in this case a preferable one is a self-cross-linking type one containing a curing agent, for example, hexamethylenediamine.

As the phenols, usable ones are, for example, phenol, resorcin, cresol, xylol, and the like. As the aldehydes, usable ones are, for example, formalin, paraformaldehyde, furfural, and the like. Further, they may be used as mixtures. Commercially available products as phenol resins may be used for them.

The preferable ratio of the resin in the resin-impregnated carbon fiber paper of the present invention is 30 to 70% by mass. From the viewpoint that the structure of the porous carbon electrode substrate becomes dense and that the strength of the electrode substrate to be obtained is high, 30% by mass or higher is preferable. On the other hand, from the viewpoint that the porosity and gas permeability of the electrode substrate to be obtained can be kept excellent, 70% by mass or lower is preferable. The term, resin-impregnated carbon fiber paper, means carbon fiber paper impregnated with a resin and not treated with heating and pressing yet, and in the case where a solvent is used for impregnation with a resin, the term means the one from which the solvent is removed.

In the impregnation process of a thermosetting resin, a conductive substance maybe mixed with the thermosetting resin. As the conductive substance, examples are carbonaceous milled fibers, carbon black, acetylene black, isotropic graphite powder, and the like. The mixing ratio of the conductive substance to be added in the resin is preferably 1 to 10% by mass based on the resin. If the mixing ratio is less than 1% by mass, it is disadvantageous in that the effect on the conductivity improvement is slight, and if the mixing ratio exceeds 10% by mass, it is disadvantageous in that the effect on the conductivity improvement tends to be saturated and that cost is increased.

Preferable methods for impregnating carbon fiber paper with a resin or a mixture of a resin and a conductor are a method employing a squeezing apparatus and a method for overlaying a thermosetting resin film on carbon fiber paper. The method employing a squeezing apparatus is a method involving steps of immersing carbon fiber paper in a resin solution or a resin mixed solution, applying the solution to the whole body of the carbon fiber paper evenly by the squeezing apparatus, and adjusting the quantity of the solution by changing the distance between rolls of the squeezing apparatus. In the case of a relatively low viscosity, a spraying method or the like is also applicable.

The method of using a thermosetting resin film is a method involving steps of once applying a thermosetting resin to mold release paper to obtain a thermosetting resin film and then laminating the film to carbon fiber paper and carrying out heating and pressing treatment to transfer the thermosetting resin.

The heating and pressing process in the present invention is preferable to be carried out continuously in the whole length of the carbon fiber paper from the viewpoint of productivity. Further, prior to the heating and pressing process, preheating is preferably carried out. In the preheating process, the thermosetting resin is softened and in the succeeding heating and pressing process, the thickness of an electrode substrate can be well controlled by pressing. An electrode substrate with the desired thickness and density can be obtained by pressing the preheated resin-impregnated carbon fiber paper at a temperature higher than the preheating temperature by 50° C. or more. In order to obtain an electrode substrate with the desired thickness and density, a plurality of resin-impregnated carbon fiber paper sheets may be piled and then subjected to the heating and pressing treatment.

The foregoing heating and pressing treatment is preferably carried out using a continuous type hot roll press machine or a continuous type hot press machine equipped with a pair of endless belts. The latter continuous type hot press machine conveys a substrate by belts, and tensile force is scarcely applied to the substrate. Consequently, the substrate is hardly broken during the production and the machine is excellent in terms of through-passing property. On the other hand, the former continuous type hot roll press machine is simple in the structure and its running cost is low. The above described two heating and pressing manners are suitable methods for continuously curing the resin and preferable to be employed for production of the electrode substrate of the present invention.

The pressing pressure at the time of employing the foregoing continuous type press machine is preferably $1.5 \times 10^4$ to $1 \times 10^5$ N/m. The heating and pressing treatment is a process necessary to sufficiently penetrate fibers with the resin and to increase the bending strength. By pressing at the pressure of $1.5 \times 10^4$ N/m or higher when thermally curing the resin, sufficient conductivity and flexibility can be achieved. On the other hand, by pressing at the pressure of $1 \times 10^5$ N/m or lower, the vapor generated from the resin at the time of curing the resin can sufficiently be released to the outside and consequently occurrence of cracking can be suppressed.

The heating temperature of the heating and pressing treatment is preferably 140° C. or higher from the viewpoint of the hardening treatment duration and of the productivity and preferably 320° C. or lower from the viewpoint of the cost for the equipment such as heating and pressing apparatus. Further preferably, the temperature is within a range of 160 to 300° C. The temperature of the foregoing preheating is preferably within a range from 100 to 180° C.

In the present invention, it is preferable to continuously carry out carbonization, which succeeds the resin curing, in the whole length of the carbon fiber paper. If the electrode substrate is long, not only the productivity of the electrode substrate is increased, but also the succeeding process of MEA production can continuously be carried out to contribute to considerable cost down of a fuel cell. Practically, it is preferable to carry out the carbonization by continuously firing the whole length of the carbon fiber paper in a temperature range of 1,000 to 3,000° C. in an inert atmosphere. In the carbonization of the present invention, pretreatment by pre-carbonizing in an inert atmosphere of about 300 to 800° C. range may be carried out before the carbonization treatment by firing in a temperature range of 1,000 to 3,000° C. in an inert atmosphere.

The electrode substrate finally obtained by the above described manner is preferable to be rolled around a roll with the outer diameter of 50 cm or smaller and more preferable to be rolled around a roll with the outer diameter of 40 cm or smaller. If the electrode substrate can be rolled around a roll with the outer diameter of 50 cm or smaller, the electrode substrate in the form of a product can be compact and is advantageous in the packing and transportation cost.

Hereinafter, the present invention will more particularly be described according to examples.

The physical values and the like in the examples were measured by the following methods.

1) Carbon fiber diameter

The diameter of carbon fibers was measured by helium-neon laser (SLB DIA MEASURING SYSTEM; produced by Anritsu Co.) as described in JIS R-7601. The measurement was carried out for 100 carbon fibers and an average value was employed as an average diameter of the carbon fibers.

2) Thickness

The thickness was measured by employing a thickness measurement apparatus, Dial Thickness Gauge 7321 (produced by Mitsutoyo Co., Ltd.). The size of the measuring gauge was 10 mm in diameter and the measurement pressure was constantly 1.5 kPa.

3) Bending strength of electrode substrate

The measurement was carried out by employing a bending strength testing apparatus. The distance between the supporting points was set to be 2 cm, load was applied at strain rate of 10 mm/min, and the rupture load of the pressing wedge was measured from the starting the application of the load to the moment when samples were ruptured and the bending strength was calculated according to the following equation.

$$\text{Bending strength } (MPa) = \frac{3PL}{2Wh^2} \quad (2)$$

wherein P: rupture load (N); L: distance between supporting points (mm); W: width of a sample (mm); h: height of a sample (mm).

Incidentally, the value in the longitudinal direction was measured for continuous samples.

4) Deflection of electrode substrate

Measurement was carried out by employing a bending strength testing apparatus. The distance between the supporting points was set to be 2 cm, load was applied at strain rate of 30 mm/min and the moving distance of the pressing wedge was measured from the starting the application of the load to the moment when samples were ruptured, to measure the deflection.

5) Gas permeability coefficient

According to JIS-P8117 and using a Gurley densometer, the time taken for a gas in 200 mm$^3$ volume to pass through was measured to calculate the gas permeability coefficient.

6) Measurement of through-plane resistivity

The resistivity value was measured by applying electric current with current density of 10 mA/cm$^2$ while a sample being sandwiched between copper plates and pressurized at 1 MPa from the upper and the lower sides of the copper plates and the piercing resistivity was calculated based on the following equation.

Trough-plane resistivity ($\Omega \cdot cm^2$)=measured resistivity value ($\Omega$)×sample surface area (cm$^2$) . . . (3)

EXAMPLE 1

Fiber bundles of polyacrylonitrile (PAN) type carbon fibers with an average fiber diameter of 4 $\mu$M were cut to obtain short fibers with an average fiber length of 3 mm.

Next, the short fiber bundles were spread in water and sufficiently dispersed, then short fibers of polyvinyl alcohol (PVA) (VBP 105-1 in cut length 3 mm; produced by Kuraray Co., Ltd.) as a binder was evenly dispersed in 15% by mass in the total amount of the carbon fibers and PVA, paper manufacturing was manually carried out according to JIS P-8209 method using a standard square sheet machine (No. 2555 Standard square sheet machine; produced by Kumagai Riki Industry Co., Ltd.), and the obtained paper was dried to obtain carbon fiber paper. PVA fibers were in half-dissolved state and contacted the carbon fibers with one another. The areal weight of the obtained carbon fiber paper was 60 g/cm$^2$.

The carbon fiber paper was immersed in an ethanol solution containing 15% by mass of a phenol resin (Resitop PL-2211, produced by Gun-ei Chemical Industry Co., Ltd.) and pulled out to impregnate 100 parts by mass of the carbon fibers with 100 parts by mass of the phenol resin and then dried with a hot air, and then the resultant carbon fiber paper was sandwiched between fluorinated iron plates and kept in conditions of 170° C. and 15 MPa for 15 minutes by a batch press apparatus to cure the phenol resin.

Successively, the obtained intermediate substrate was heated at 2,000° C. in a nitrogen gas atmosphere in a batch carbonization furnace for one hour to carbonize the substrate and obtain a porous carbon electrode substrate. Both of the bending strength and the deflection were consequently excellent.

The production conditions of carbon fiber paper sheets of the examples and comparative examples are shown in Table 1: the production conditions of electrode substrates in Table 2: and the evaluation results of the electrode substrates in Table 3.

EXAMPLE 2

An electrode substrate was obtained in the same manner as the example 1 except that the paper manufacturing was continuously carried out in the following manner.

Fiber bundles of short carbon fibers were spread in water in a slurry tank and sufficiently dispersed, and then short fibers of polyvinyl alcohol (PVA) as a binder (the same one used in the example 1) was evenly dispersed and web was sent out. The sent out web was passed through short net plate and dried by a drier to obtain carbon fiber paper with the length of 20 m. The obtained carbon fiber paper had the areal weight of 60 g/cm$^2$. Further the long carbon fiber paper was cut into 25 cm length for the successive processes.

The electrode substrate of the present invention was provided with remarkably improved strength owing to the continuous paper-manufacturing and was also excellent in the deflection.

EXAMPLE 3

A long carbon fiber paper sheet was produced in the same manner as the example 2, and the carbon fiber paper was impregnated with a thermosetting resin by a dip-nip method. That is, the carbon fiber paper was continuously sent to a tray containing a methanol solution containing of 20% by weight of a phenol resin (Phenolite J-325, produced by Dainippon Ink and Chemicals, Inc.), the resin was squeezed by a squeezing apparatus, and then a hot air was continuously blown to dry and obtain resin-impregnated carbon fiber paper. In this case 100 parts by mass of carbon fibers were impregnated with 100 parts by mass of the phenol resin.

Next, the resin-impregnated carbon fiber paper was continuously heated and pressed by a continuous type hot roll press machine illustrated in FIG. 1 to obtain resin-cured carbon fiber paper. That is, the above described resin-impregnated carbon fiber paper 1 was sent out the rolls and while being sandwiched between mold release agent-coated substrates 2, the carbon fiber paper was sent to a preheating zone 4, successively to a heating and pressing zone 5, and then the mold release agent-coated substrates 2 were removed and the obtained resin-cured carbon fiber paper was rolled around a roll. In this case, the preheating temperature in the preheating zone was 150° C. and the preheating duration was 5 minutes and the temperature of the heating and pressing zone was 250° C. and the press pressure was 1.5×10$^4$ N/m line pressure.

After that, the obtained resin-cured carbon fiber paper with the width of 30 cm and the length of 20 m was cut at every 25 cm and fired in the same manner as the examples 1 and 2 to obtain an electrode substrate. Both of the bending strength and the deflection were excellent.

EXAMPLE 4

An electrode substrate was obtained in the same manner as the example 3 except that the press pressure of the roll press machine was heightened to $7.5 \times 10^4$ N/m of line pressure. Owing to the high press pressure, the substrate was made thin and the bending strength was high and the deflection value was also high.

EXAMPLE 5

A resin-cured carbon fiber paper obtained by paper-manufacturing, impregnating with a resin, and subjecting to roll press in the same manner as the example 4 was heated for 10 minutes in a continuous firing furnace at 2,000° C. in a nitrogen gas atmosphere, without being cut into pieces, to carbonize the carbon fiber paper and to continuously obtain a carbon electrode substrate with the length of 20 m, and the substrate was rolled around a cylindrical paper tube with the outer diameter of 30 cm. The thickness was thin, the bending strength was high and the deflection value was also high.

EXAMPLE 6

Figure 2:
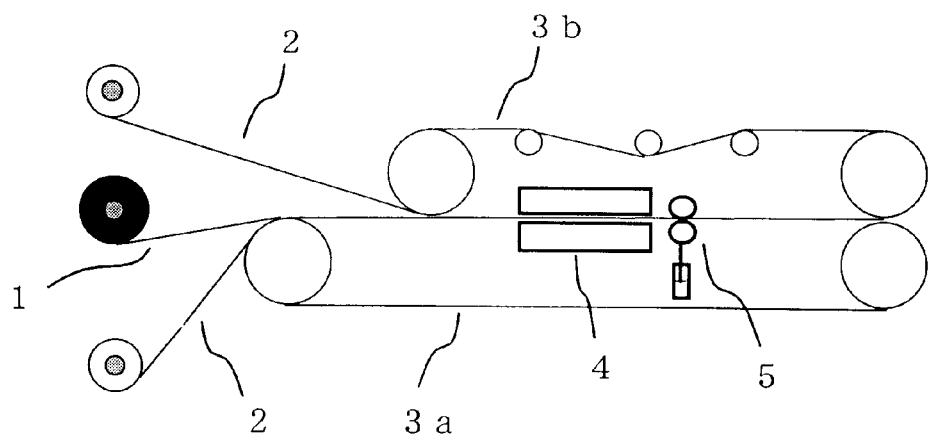
FIG. 2 shows an example of a continuous type hot press machine equipped with a pair of endless belts and suitable to be used for the production method of the present invention. 1 . . . resin-impregnated carbon fiber paper, 2 . . . mold release agent-coated substrate, 3a, 3b . . . endless belts, 4 . . . preheating zone, 5 . . . heating and pressing zone.

After being subjected to continuous paper-manufacturing and impregnating with a resin process in the same manner as the example 3 except that the areal weight was controlled to be 100 g/m², the obtained resin-impregnated carbon fiber paper was continuously subjected to hot press by a continuous type hot press machine (a double belt press machine: DBP) equipped with a pair of endless belts as illustrated in FIG. 2 to obtain resin-cured carbon fiber paper. That is, the above described resin-impregnated carbon fiber paper 1 was placed between the mold release agent-coated substrates 2 and were sent between continues belt apparatuses 3a, 3b, to a preheating zone 4, and successively to a heating and pressing zone 5. After that, as same in the case of the roll press machine of FIG. 1, the mold release agent-coated substrates 2 were removed and the obtained resin-cured carbon fiber paper was rolled around a roll. The continuous belt apparatuses 3a, 3b conveyed resin-impregnated carbon fiber paper 1 and the like by respectively being rotated. In this case, the preheating temperature in the preheating zone was 160° C. and the preheating duration was 5 minutes and the temperature of the heating and pressing zone was 280° C. and the press pressure was $1.5 \times 10^4$ N/m of line pressure. After that, the obtained resin-cured carbon fiber paper with the width of 30 cm and the length of 20 m was cut at every 25 cm and fired in the same manner as the examples 1 and 2 to obtain an electrode substrate. The substrate was smooth, and both of the bending strength and the deflection were excellent.

EXAMPLE 7

An electrode substrate was obtained in the same manner as the example 6 except that the press pressure of the double belt press (DBP) machine was increased to $7.5 \times 10^4$ N/m of line pressure. Owing to the high press pressure, the substrate was made thin and the bending strength was high and the deflection value was also high.

EXAMPLE 8

Continuous paper-manufacturing and impregnation with a resin were carried out in the same manner as the example 7 except that carbon fiber paper was continuously obtained while the areal weight being adjusted to be 30 g/m². The heating and pressing process was carried out in the same manner as the example 7 except two sheets of the obtained resin-impregnated carbon fiber paper were piled in the manner that the same paper-manufactured faces were set face to face in the inside at the time of double belt press. The obtained substrate, without being cut, was subjected to precarbonization treatment by heating at 300 to 600° C. for 5 minutes in a nitrogen gas atmosphere in a furnace and then carbonized by heating at 1,600 to 2,000° C. for 10 minutes in a continuous carbonizing furnace to continuously obtain a carbon electrode substrate with the length of 20 m, and the substrate was rolled around a paper tube with the outer diameter of 30 cm. The obtained substrate was not at all warped and thin and provided with high bending strength and a high deflection value as well.

EXAMPLE 9

A carbon electrode substrate was obtained in the same manner as the example 8 except that short fibers with an average fiber diameter of 4 μm and an average fiber length of 6 mm were used instead of the short fibers with an average fiber diameter of 4 μm and an average fiber length of 3 mm. Although the dispersibility was relatively decreased, the strength, the deflection and the gas permeability were all together excellent.

EXAMPLE 10

Fiber bundles of polyacrylonitrile (PAN) type carbon fibers with an average fiber diameter of 4 μm were cut to obtain short fibers with an average fiber length of 3 mm. On the other hand, fiber bundles of PAN type carbon fibers with an average fiber diameter of 7 μm were cut to obtain short fibers with an average fiber length of 6 mm. Next, the short fiber bundles so mixed in the ratio of the short fibers with the fiber diameter of 4 μm and with the fiber diameter of 7 μm as 4 μm/7 μm=8/11 were spread in water and sufficiently dispersed, and then short fibers of polyvinyl alcohol (PVA) (the same one used in the example 1) as a binder was evenly dispersed in 5% by mass based on the total amount of the carbon fibers and PVA, and paper manufacturing was carried out according to JIS P-8209 method using a standard square sheet machine (the same one used in the example 1). Except that described above, the obtained paper was subjected to resin impregnation, batch press, and batch carbonization to obtain an electrode substrate. Both of the bending strength and the deflection were consequently excellent.

EXAMPLE 11

Paper manufacturing was carried out by using a wet type continuous paper-manufacturing apparatus, and impregnation with a resin, batch press and batch carbonization were carried out in the same manner as the example 2 except that the short carbon fibers and PVA were mixed in the same ratio as that of the example 10 to obtain an electrode substrate. As compared with the results of the example 10, the bending strength was remarkably increased and the deflection was also excellent.

EXAMPLE 12

Paper manufacturing was carried out by using a wet type continuous paper-manufacturing apparatus, and continuous resin impregnation and resin drying, and then roll press and batch carbonization were carried out in the same manner as the example 3 except that the short carbon fibers and PVA were mixed in the same ratio as that of the example 10 to obtain an electrode substrate. Both of the bending strength and the deflection were excellent.

EXAMPLE 13

Paper manufacturing was carried out by using a wet type continuous paper-manufacturing apparatus, and continuous resin impregnation and resin drying, and then roll press and batch carbonization were carried out in the same manner as the example 4 except that the short carbon fibers and PVA were mixed in the same ratio as that of the example 10 to obtain an electrode substrate. Since pressing was carried out at a higher pressure than that in the example 12, the electrode substrate was thinner than the electrode substrate of the example 12, and bending strength and the deflection were higher than those of the substrate of the example 12.

EXAMPLE 14

Paper manufacturing was carried out by using a wet type continuous paper-manufacturing apparatus, and continuous resin impregnation and resin drying, and then roll press and continuous carbonizing were carried out in the same manner as the example 5 except that the short carbon fibers and PVA were mixed in the same ratio as that of the example 10 to obtain an electrode substrate with the width of 30 cm and the length of 20 m which was rolled on a cylindrical paper tube with the outer diameter of 30 cm. The electrode substrate was thin and the bending strength and the deflection of the substrate were high.

EXAMPLE 15

Paper manufacturing was carried out by using a wet type continuous paper-manufacturing apparatus, and continuous resin impregnation and resin drying, and then double belt press (DBP) and batch carbonization were carried out in the same manner as the example 6 except that the short carbon fibers and PVA were mixed in the same ratio as that of the example 10 to obtain an electrode substrate. Both of the bending strength and the deflection of the substrate were consequently excellent.

EXAMPLE 16

Paper manufacturing was carried out by using a wet type continuous paper-manufacturing apparatus, and continuous resin impregnation and resin drying, and double belt press (DBP) and batch carbonization were carried out in the same manner as the example 7 except that the short carbon fibers and PVA were mixed in the same ratio as that of the example 10 to obtain an electrode substrate. Since pressing was carried out at a higher pressure than that in the example 15, the electrode substrate was thinner than the electrode substrate of the example 15 and bending strength and the deflection were higher than those of the substrate of the example 15.

EXAMPLE 17

Paper manufacturing was carried out by using a wet type continuous paper-manufacturing apparatus, and continuous resin impregnation and resin drying, and double belt press (DBP) and continuous carbonizing were carried out in the same manner as the example 8 except that the short carbon fibers and PVA were mixed in the same ratio as that of the example 10 to obtain an electrode substrate with the width of 30 cm and the length of 20 m which was rolled on a cylindrical paper tube with the outer diameter of 30 cm. The obtained electrode substrate was completely free of warp and thin and provided with a high bending strength and a high deflection value.

EXAMPLE 18

A carbon electrode substrate was obtained in the same manner as the example 17 except that short fibers with an average fiber diameter of 4 $\mu$m and an average fiber length of 6 mm were used instead of the short fibers with an average fiber diameter of 4 $\mu$m and an average fiber length of 3 mm. Although the dispersibility was relatively decreased, the strength, the deflection and the gas permeability were all together excellent.

EXAMPLE 19

A carbon electrode substrate was obtained in the same manner as the example 1 except that polyacrylonitrile (PAN) type pulp was used as a binder instead of PVA when paper manufacturing. Although the bonding force of the short carbon fibers was lower than that in the case of using PVA, both of the strength and the deflection were consequently excellent.

EXAMPLE 20

A carbon electrode substrate was obtained in the same manner as the example 1 except that carbon fiber paper was impregnated with a phenol resin using a resin solution of the phenol resin mixed with 1% by mass of carbon black MA 100 (produced by Mitsubishi Chemical Industries Ltd.) versus the resin, at the time of resin impregnation. The conductivity was a high value.

EXAMPLE 21

A carbon electrode substrate was obtained in the same manner as the example 8 except that 35 parts by mass of carbon fiber paper was impregnated with 65 parts by mass of the phenol resin. Although the gas permeability was slightly decreased, both of the bending strength and the deflection were excellent.

EXAMPLE 22

After a long carbon fiber paper sheet was continuously obtained in the same manner as the example 2, long phenol resin films with areal weight of 30 g/m$^2$ were obtained by applying a phenol resin (Phenolite 5900, produced by Dainippon Ink and Chemicals, Inc.) from which a solvent was removed to mold release paper sheets by a coater. The carbon fiber paper sheet was sandwiched between the phenol resin films from the upper and the lower sides to transfer the phenol resin to the carbon fiber paper sheet, and then the carbon fiber paper sheet was subjected to degassing and rolled.

The obtained resin-impregnated carbon fiber paper was subjected to press curing by a double belt machine and continuously carbonized in the same manner as the example 8 except that the obtained resin-impregnated carbon fiber paper was not piled double, to obtain an electrode substrate with the width of 30 cm and the length of 20 m. The gas permeability was excellent and both of the bending strength and the deflection were excellent as well.

Comparative Example 1

Carbon fiber paper of 60 g/m$^2$ was obtained by continuous paper manufacturing process in the same manner as the example 2 while using only PAN type short carbon fibers with an average fiber diameter of 7 $\mu$m as carbon fibers (the same ones as used in the example 10). Further, an electrode substrate was produced from the carbon fibers by impregnation with resin in the same manner as the example 3 and belt press and continuous carbonization in the same manner as the example 22. Although the gas permeability coefficient was high, the deflection was low to cause cracking when the substrate was rolled around a roll.

Comparative Example 2

Carbon fiber paper of 30 g/m² was obtained by continuous paper manufacturing process in the same manner as the example 8 while using only PAN type short carbon fibers with an average fiber diameter of 7 μm as carbon fibers as same in the comparative example 1. Successively, the carbon fiber paper was subjected to impregnation with resin in the same manner as the example 3, but without carrying out press, the resin was continuously cured at 180° C. and the carbon fiber paper was continuously carbonized as it was. The obtained electrode substrate was very brittle.

Comparative Example 3

An electrode substrate was produced in the same manner as the example 1 except that the pitch type carbon fibers with an average fiber length of 11 mm were used instead of the PAN type carbon fibers. The bending strength was inferior and the electrode substrate was brittle.

TABLE 1

Methods for producing carbon fiber paper sheets in examples and comparative examples

| | A) CF of 4 μm diameter in the total CF (% by mass) | Fiber length of CF of 4 μm diameter (mm) | B) CF of 7 μm diameter in the total CF (% by mass) | Fiber length of CF of 7 μm diameter (mm) | C) Binder | Mixing ratio by mass A/B/C | Areal weight of carbon fiber paper (g/m²) | Paper-manufacturing method |
|---|---|---|---|---|---|---|---|---|
| Example 1 | 100 | 3 | — | — | PVA | 85/0/15 | 60 | manual |
| Example 2 | 100 | 3 | — | — | PVA | 85/0/15 | 60 | continuous |
| Example 3 | 100 | 3 | — | — | PVA | 85/0/15 | 60 | continuous |
| Example 4 | 100 | 3 | — | — | PVA | 85/0/15 | 60 | continuous |
| Example 5 | 100 | 3 | — | — | PVA | 85/0/15 | 60 | continuous |
| Example 6 | 100 | 3 | — | — | PVA | 85/0/15 | 100 | continuous |
| Example 7 | 100 | 3 | — | — | PVA | 85/0/15 | 100 | continuous |
| Example 8 | 100 | 3 | — | — | PVA | 85/0/15 | 30 × 2 | continuous |
| Example 9 | 100 | 6 | — | — | PVA | 85/0/15 | 30 × 2 | continuous |
| Example 10 | 42 | 3 | 58 | 6 | PVA | 40/55/5 | 60 | manual |
| Example 11 | 42 | 3 | 58 | 6 | PVA | 40/55/5 | 60 | continuous |
| Example 12 | 42 | 3 | 58 | 6 | PVA | 40/55/5 | 60 | continuous |
| Example 13 | 42 | 3 | 58 | 6 | PVA | 40/55/5 | 60 | continuous |
| Example 14 | 42 | 3 | 58 | 6 | PVA | 40/55/5 | 60 | continuous |
| Example 15 | 42 | 3 | 58 | 6 | PVA | 40/55/5 | 100 | continuous |
| Example 16 | 42 | 3 | 58 | 6 | PVA | 40/55/5 | 100 | continuous |
| Example 17 | 42 | 3 | 58 | 6 | PVA | 40/55/5 | 30 × 2 | continuous |
| Example 18 | 42 | 6 | 58 | 6 | PVA | 40/55/5 | 30 × 2 | continuous |
| Example 19 | 100 | 3 | — | — | PAN pulp | 85/0/15 | 60 | manual |
| Example 20 | 100 | 3 | — | — | PVA | 85/0/15 | 60 | manual |
| Example 21 | 100 | 3 | — | — | PVA | 85/0/15 | 30 × 2 | continuous |
| Example 22 | 100 | 3 | — | — | PVA | 85/0/15 | 60 | continuous |
| Comparative example 1 | — | — | 100 | 6 | PVA | 0/85/15 | 60 | continuous |
| Comparative example 2 | — | — | 100 | 6 | PVA | 0/85/15 | 30 | continuous |
| Comparative example 3 | pitch 100 | 11 | — | — | PVA | 85/0/15 | 60 | manual |

CF: carbon fibers

TABLE 2

Methods for producing electrode substrate in examples and comparative examples

| | Thermo-setting resin | Resin/CF mass ratio | Heating and pressing method | Batch pressing pressure (MPa) | Continuous pressing line pressure (x10⁴ N/m) | Conductive substance | Carbonization method | Rolled |
|---|---|---|---|---|---|---|---|---|
| Example 1 | PL2211 | 50/50 | batch | 15 | — | — | batch | — |
| Example 2 | PL2211 | 50/50 | batch | 15 | — | — | batch | — |
| Example 3 | PJ325 | 50/50 | roll | — | 1.5 | — | batch | — |
| Example 4 | PJ325 | 50/50 | roll | — | 7.5 | — | batch | — |
| Example 5 | PJ325 | 50/50 | roll | — | 7.5 | — | continuous | 20 m |
| Example 6 | PJ325 | 50/50 | DBP | — | 1.5 | — | batch | — |
| Example 7 | PJ325 | 50/50 | DBP | — | 7.5 | — | batch | — |

TABLE 2-continued

Methods for producing electrode substrate in examples and comparative examples

| | Thermo-setting resin | Resin/CF mass ratio | Heating and pressing method | Batch pressing pressure (MPa) | Continuous pressing line pressure (x10$^4$ N/m) | Conductive substance | Carbonization method | Rolled |
|---|---|---|---|---|---|---|---|---|
| Example 8 | PJ325 | 50/50 | DBP | — | 7.5 | — | continuous | 20 m |
| Example 9 | PJ325 | 50/50 | DBP | — | 7.5 | — | continuous | 20 m |
| Example 10 | PL2211 | 50/50 | batch | 15 | — | — | batch | — |
| Example 11 | PL2211 | 50/50 | batch | 15 | — | — | batch | — |
| Example 12 | PJ325 | 50/50 | roll | — | 1.5 | — | batch | — |
| Example 13 | PJ325 | 50/50 | roll | — | 7.5 | — | batch | — |
| Example 14 | PJ325 | 50/50 | roll | — | 7.5 | — | continuous | 20 m |
| Example 15 | PJ325 | 50/50 | DBP | — | 1.5 | — | batch | — |
| Example 16 | PJ325 | 50/50 | DBP | — | 7.5 | — | batch | — |
| Example 17 | PJ325 | 50/50 | DBP | — | 7.5 | — | continuous | 20 m |
| Example 18 | PJ325 | 50/50 | DBP | — | 7.5 | — | continuous | 20 m |
| Example 19 | PL2211 | 50/50 | batch | 15 | — | — | batch | — |
| Example 20 | PL2211 | 50/50 | batch | 15 | — | CB 1% | batch | — |
| Example 21 | PJ325 | 65/35 | DBP | — | 7.5 | — | continuous | 20 m |
| Example 22 | film | 50/50 | DBP | — | 7.5 | — | continuous | 20 m |
| Comparative example 1 | PJ325 | 50/50 | DBP | — | 7.5 | — | continuous | 20 m |
| Comparative example 2 | PJ325 | 50/50 | — | — | — | — | continuous | 20 m |
| Comparative example 3 | PL2211 | 50/50 | batch | 15 | — | — | batch | — |

CB: carbon black

TABLE 3

Evaluation results of electrode substrates of examples and comparative examples

| | Thickness (mm) | Bulk density (g/cm$^3$) | Bending strength (MPa) | Deflection (mm) | Trough-plane resistivity when pressed at 1 MPa (mΩ-cm$^2$) | Gas permeability (ml/hr/cm$^2$/mmAq) |
|---|---|---|---|---|---|---|
| Example 1 | 0.17 | 0.39 | 11 | 2.4 | 3.98 | 2880 |
| Example 2 | 0.17 | 0.48 | 60 | 2.4 | 3.98 | 1020 |
| Example 3 | 0.17 | 0.45 | 50 | 2.1 | 3.75 | 1780 |
| Example 4 | 0.15 | 0.55 | 60 | 2.5 | 3.66 | 820 |
| Example 5 | 0.14 | 0.57 | 80 | 2.7 | 3.22 | 760 |
| Example 6 | 0.27 | 0.49 | 55 | 1.6 | 6.07 | 500 |
| Example 7 | 0.23 | 0.58 | 78 | 1.8 | 5.89 | 440 |
| Example 8 | 0.14 | 0.61 | 130 | 2.9 | 3.12 | 720 |
| Example 9 | 0.14 | 0.58 | 92 | 2.7 | 3.11 | 1000 |
| Example 10 | 0.16 | 0.39 | 13 | 2.3 | 4.08 | 1760 |
| Example 11 | 0.17 | 0.48 | 63 | 2.5 | 3.78 | 1400 |
| Example 12 | 0.17 | 0.45 | 52 | 2.0 | 3.9 | 1460 |
| Example 13 | 0.14 | 0.55 | 61 | 2.4 | 3.82 | 1000 |
| Example 14 | 0.14 | 0.57 | 83 | 2.7 | 3.49 | 960 |
| Example 15 | 0.27 | 0.49 | 57 | 1.5 | 6.47 | 860 |
| Example 16 | 0.23 | 0.58 | 79 | 1.7 | 6.19 | 560 |
| Example 17 | 0.14 | 0.58 | 92 | 2.6 | 3.12 | 900 |
| Example 18 | 0.14 | 0.58 | 82 | 2.8 | 3.42 | 2400 |
| Example 19 | 0.17 | 0.41 | 11 | 2.3 | 3.21 | 2800 |
| Example 20 | 0.18 | 0.41 | 15 | 2.8 | 2.95 | 2600 |
| Example 21 | 0.18 | 0.63 | 61 | 2.0 | 5.05 | 350 |
| Example 22 | 0.18 | 0.55 | 82 | 2.0 | 4.23 | 370 |
| Comparative example 1 | 0.14 | 0.55 | 80 | 1.2 | 3.61 | 1500 |
| Comparative example 2 | 0.14 | 0.29 | 4.5 | 1.2 | 2.55 | 3300 |
| Comparative example 3 | 0.18 | 0.34 | 8 | 2.4 | 3.21 | 6000 |

*The distance between supporting points was kept constantly at 2 cm.

INDUSTRIAL APPLICABILITY

A porous carbon electrode substrate for a fuel cell of the present invention is a substrate excellent in flexibility, durable to bending and able to be rolled around a roll, and thus having high productivity. Carbon fiber paper of the present invention is suitable for producing such an excellent electrode substrate. According to the production method of the present invention for producing the porous carbon electrode substrate for a fuel cell, such an excellent electrode substrate can be produced.

What is claimed is:

1. Carbon fiber paper consisting of an organic high-molecular weight compound as a binder and carbon fibers, the carbon fibers contain thin fibers with having an average diameter smaller than 5 $\mu$m and an average fiber length of 3 to 10 mm.

2. The carbon fiber paper as claimed in claim 1, wherein said organic high-molecular weight compound is a polymer comprising polyvinyl alcohol.

3. The carbon fiber paper as claimed in claim 1, wherein said organic high-molecular high-molecular weight compound is in the form of a pulp or short fibers of a polymer selected from the group consisting of acrylonitrile polymers.

4. The carbon fiber paper as claimed in any one of claims 1 to 3, wherein said carbon fibers are only carbon fibers from a polyacrylonitrile polymer.

5. The carbon fiber paper as claimed in claim 4, wherein said thin fibers having an average diameter larger than 3 $\mu$m and smaller than 5 $\mu$m and said carbon fibers are a mixture of said thin fibers and thick fibers having an average diameter not smaller than 5 $\mu$m and smaller than 9 $\mu$m and an average fiber length of 3 to 10 mm.

6. The carbon fiber paper as claimed in claim 5, wherein said carbon fibers contain not less than 40% by mass of the thin fibers.

7. The carbon fiber paper as claimed in claim 4, wherein said carbon fibers contain not less than 40% by mass of the thin fibers.

8. The carbon fiber paper as claimed in any one of claims 1 to 3, wherein said thin fibers with have an average diameter larger than 3 $\mu$m and smaller than 5 $\mu$m and an average fiber length of 3 to 10 mm, and said carbon fibers are a mixture of said thin fibers and thick fibers with having an average diameter not smaller than 5 $\mu$m and smaller than 9 $\mu$m and an average fiber length of 3to 10mm.

9. The carbon fiber paper according to any one of claims 1 to 3, wherein said carbon fibers contain not less than 40% by mass of the thin fibers.

10. A carbon fiber paper as claimed in claim 1, wherein said binder comprises 5 to 40% of said carbon fiber paper.

11. A carbon fiber paper as claimed in claim 10, wherein said binder comprises 15 to 30% of said carbon fiber paper.

12. A carbon fiber paper as claimed in claim 1, wherein carbon fibers have been oriented in said carbon fiber paper.

13. A carbon fiber paper as claimed in claim 1, wherein said carbon fibers have an average carbon fiber length of 3 to 9 mm.

14. A carbon fiber paper as claimed in claim 1, wherein said thin fibers have an average diameter from 3 $\mu$m to 4.5 $\mu$m.

15. A carbon fiber paper as claimed in claim 1, wherein said carbon fibers are a mixture of said thin fibers and thick fibers, said thick fibers being present but in an amount of up to 60% by mass of said carbon fibers.

* * * * *